US012712198B2

(12) United States Patent
Yun et al.

(10) Patent No.: US 12,712,198 B2
(45) Date of Patent: Aug. 18, 2026

(54) SECONDARY BATTERY AND METHOD FOR MANUFACTURING THE SAME

(71) Applicant: LG ENERGY SOLUTION, LTD., Seoul (KR)

(72) Inventors: Su Hyun Yun, Daejeon (KR); Bum Young Jung, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 875 days.

(21) Appl. No.: 17/774,631

(22) PCT Filed: Apr. 28, 2021

(86) PCT No.: PCT/KR2021/005388
§ 371 (c)(1),
(2) Date: May 5, 2022

(87) PCT Pub. No.: WO2021/235724
PCT Pub. Date: Nov. 25, 2021

(65) Prior Publication Data

US 2022/0393223 A1 Dec. 8, 2022

(30) Foreign Application Priority Data

May 20, 2020 (KR) ........................ 10-2020-0060586

(51) Int. Cl.
*H01M 10/04* (2006.01)
*H01M 50/15* (2021.01)

(52) U.S. Cl.
CPC ....... *H01M 10/0431* (2013.01); *H01M 50/15* (2021.01)

(58) Field of Classification Search
CPC ...... Y02P 70/50; Y02E 60/10; H01M 10/125; H01M 10/286; H01M 10/045–0459;
(Continued)

(56) References Cited

U.S. PATENT DOCUMENTS

| | | | |
|---|---|---|---|
| 10,541,442 | B2 | 1/2020 | Iwasaki et al. |
| 2002/0160263 | A1 | 10/2002 | Corrigan et al. |

(Continued)

FOREIGN PATENT DOCUMENTS

| | | | |
|---|---|---|---|
| CN | 101485033 | A | 7/2009 |
| CN | 204706612 | U | 10/2015 |

(Continued)

OTHER PUBLICATIONS

Extended European Search Report for European Application No. 21808512.4, dated Jan. 11, 2024.

(Continued)

*Primary Examiner* — Mayla Gonzalez Ramos
*Assistant Examiner* — Bethany C Garcia
(74) *Attorney, Agent, or Firm* — Birch, Stewart, Kolasch & Birch, LLP

(57) ABSTRACT

A secondary battery includes an electrode assembly including a first electrode bent in a zigzag shape, a second electrode bent in a zigzag shape to overlap the first electrode, and a separator bent in a zigzag shape to be interposed between the first and second electrodes; a can configured to accommodate the electrode assembly; and a cap part mounted in an opening of the can. An upper end of the first electrode is disposed on the uppermost end of the electrode assembly to extend longer than the second electrode, a lower end of the second electrode on the lowermost end of the electrode assembly extends longer than the first electrode, a first protrusion piece bonded to the cap part provided on the upper end of the first electrode, and a second protrusion piece bonded to the can provided on the lower end of the second electrode.

15 Claims, 12 Drawing Sheets

(58) Field of Classification Search

CPC ........... H01M 10/0525; H01M 10/058; H01M 10/538; H01M 4/13; H01M 50/136; H01M 50/466; H01M 50/528–536; H01M 50/538; H01M 50/591; H01M 50/593; H01M 4/70–78; H01M 10/0463; H01M 50/54; H01M 50/55315; H01M 50/15; H01M 10/04–0583; H01M 50/531–567; Y02T 10/70

See application file for complete search history.

(56) References Cited

U.S. PATENT DOCUMENTS

2010/0003587 A1 1/2010 Jan
2010/0015529 A1 1/2010 Kim et al.
2010/0167111 A1* 7/2010 Sumihara ................ H01M 4/72 429/94
2010/0167123 A1* 7/2010 Kim ...................... H01M 50/55 429/211
2010/0221602 A1 9/2010 Itou et al.
2010/0233519 A1* 9/2010 Cheon ............... H01M 10/0431 429/56
2010/0310925 A1 12/2010 Lee
2011/0143189 A1 6/2011 Kim et al.
2012/0094168 A1 4/2012 Kim et al.
2014/0050958 A1* 2/2014 Kwon ............... H01M 10/0585 429/94
2016/0099445 A1* 4/2016 Park .................. H01M 10/0431 429/82
2017/0141433 A1 5/2017 Yoshima et al.
2018/0366785 A1* 12/2018 Honda .................. H01M 4/665

FOREIGN PATENT DOCUMENTS

| | | | |
|---|---|---|---|
| CN | 104103854 | B | 7/2016 |
| JP | 2003-217562 | A | 7/2003 |
| JP | 2016-129095 | A | 7/2016 |
| KR | 10-2000-0051741 | A | 8/2000 |
| KR | 10-2001-0019700 | A | 3/2001 |
| KR | 10-2001-0048096 | A | 6/2001 |
| KR | 20-0262458 | Y1 | 3/2002 |
| KR | 10-2006-0022358 | A | 3/2006 |
| KR | 10-2007-0110668 | | 11/2007 |
| KR | 10-0907623 | B1 | 7/2009 |
| KR | 10-2010-0131688 | A | 12/2010 |
| KR | 10-2011-0064023 | A | 6/2011 |
| KR | 10-2015-0040454 | A | 4/2015 |
| KR | 10-2016-0101783 | A | 8/2016 |
| KR | 10-2017-0032456 | A | 3/2017 |
| KR | 10-2017-0050444 | A | 5/2017 |
| KR | 10-2015-0004614 | A | 1/2018 |
| KR | 10-2018-0120100 | A | 11/2018 |

OTHER PUBLICATIONS

International Search Report (PCT/ISA/210) issued in PCT/KR2021/005388, dated Aug. 6, 2021.

* cited by examiner

SECONDARY BATTERY AND METHOD FOR MANUFACTURING THE SAME

CROSS-REFERENCE TO RELATED APPLICATION

The present application claims the benefit of the priority of Korean Patent Application No. 10-2020-0060586, filed on May 20, 2020, which is hereby incorporated by reference in its entirety.

TECHNICAL FIELD

The present invention relates to a secondary battery, in which energy density and processes are simplified, and a method for manufacturing the same.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

Such a secondary battery is classified into a can type secondary battery in which an electrode assembly is built in a metal can and a pouch type secondary battery in which an electrode assembly is built in a pouch. The can type secondary battery comprises an electrode assembly in which electrodes and separators are alternately stacked, a can accommodating the electrode assembly, and a cap part mounted in an opening of the can. In addition, the pouch type secondary battery comprises an electrode assembly in which electrodes and separators are alternately stacked, a pouch accommodating the electrode assembly, and an electrode lead bonded to an electrode tab provided in the electrode assembly.

However, the secondary battery has to secure enough space for accommodating the electrode tab and the electrode lead, and thus, there is a problem in that a degree of integration of the electrode assembly accommodated in the can is significantly reduced, and thus, energy density is reduced.

DISCLOSURE OF THE INVENTION

Technical Problem

The present invention is invented to solve the above problems, and an object of the present invention is to improve a structure of an electrode assembly to improve a degree of integration of the electrode assembly, thereby improving energy density and simplification of a process, and a method for manufacturing the same.

Technical Solution

A secondary battery according to the present invention for achieving the above object comprises: an electrode assembly comprising a first electrode bent in a zigzag shape, a second electrode bent in a zigzag shape to overlap the first electrode, and a separator bent in a zigzag shape to be interposed between the first and second electrodes; a can configured to accommodate the electrode assembly; and a cap mounted to an opening of the can, wherein an upper end of the first electrode is disposed on the uppermost end of the electrode assembly to extend above the second electrode, a lower end of the second electrode is disposed on the lowermost end of the electrode assembly to extend under the first electrode, a first protrusion piece bonded to the cap part is provided on the upper end of the first electrode, and a second protrusion piece bonded to the can is provided on the lower end of the second electrode.

The first electrode may comprise a first collector and a first electrode active material layer provided on a surface of the first collector facing the second electrode, and the first protrusion piece may be provided as an embossing part, which is bonded to the cap while protruding toward the cap at an upper end of the first collector.

The first electrode may comprise a first collector and a first electrode active material layer provided on a surface of the first collector, which faces the second electrode, and the first protrusion piece may be provided as a wrinkle part, which is bent in a zigzag shape along a width direction of the can and of which a protruding portion facing the cap is bonded to the cap at an upper end of the first collector.

A conductive adhesive member for improving conductivity may be provided on a portion of the first electrode at which the first collectors overlap each other.

A protective member having an insulating property may be provided on the cap part facing the upper end of the first electrode.

The second electrode may comprise a second collector and a second electrode active material layer provided on a surface of the second collector facing the first electrode, and the second protrusion piece may be provided as an embossing part, which is bonded to the can while protruding toward the can, at a lower end of the second collector.

The second electrode may comprise a second collector and a second electrode active material layer provided on a surface of the second collector, which faces the first electrode, and the second protrusion piece may be provided as a wrinkle part, which is bent in a zigzag shape along a width direction of the can and of which a protruding portion facing the can is bonded to the can, at a lower end of the second collector.

A conductive adhesive member for improving conductivity may be provided on a portion of the second electrode, at which the second collectors overlap each other.

A protective member having an insulating property may be provided on the can facing the lower end of the second electrode.

An insulating member having an insulating property may be provided on an end of the first protrusion piece or the second protrusion piece.

The upper end of the first electrode may have a width less than a width of a remaining portion of the first electrode.

The lower end of the second electrode may have a width less than a width of a remaining portion of the second electrode.

A method for manufacturing a secondary battery according to the present invention comprises bending a first electrode in a zigzag shape, bending a second electrode in a zigzag shape to overlap the first electrode, and bending a separator, which is interposed between the first electrode and the second electrode, in a zigzag shape, wherein an upper end of the first electrode is above the second electrode, and a lower end of the second electrode is below the first electrode; molding a first protrusion piece on the upper end of the first electrode and molding a second protrusion piece on the lower end of the second electrode; the first electrode, the separator, and the second electrode so as to assembly an electrode assembly, wherein the first protrusion piece formed on the upper end of the first electrode is disposed on an uppermost end of the electrode assembly, and the second protrusion piece formed on the lower end of the second electrode is disposed on a lowermost end of the electrode assembly; accommodating the electrode assembly in a can, wherein the second protrusion piece disposed on the lowermost end of the electrode assembly is bonded to a bottom surface of the can; and bonding a cap to an opening of the can, wherein the first protrusion piece disposed on the uppermost end of the electrode assembly is bonded to the cap part.

The first protrusion piece may be provided as an embossing part protruding toward the cap or a wrinkle part bent in a zigzag shape along a width direction of the can.

The second protrusion piece may be provided as an embossing part protruding toward the can or a wrinkle part bent in a zigzag shape along a width direction of the can.

Advantageous Effects

The secondary battery according to the present invention may comprise the electrode assembly, the can, and the cap part, and the electrode assembly may comprise the first electrode, the separator, and the second electrode, which are stacked to overlap each other in the zigzag shape. The first electrode may comprise the first protrusion piece bonded to the cap part, and the second electrode may comprise the second protrusion piece bonded to the can. Due to the above-described characteristics, the spaces between the electrode assembly and the cap part and between the electrode assembly and the can may be minimized to improve the degree of integration of the electrode assembly. As a result, there is no need for the energy density and the electrode tab and electrode lead to significantly simplify the process.

In addition, in the secondary battery according to the present invention, the first protrusion piece of the first electrode may be provided as the embossing part or the wrinkle part bonded to the cap part. Due to the above-described characteristic, the first protrusion piece and the cap part may be easily bonded to each other.

In addition, in the secondary battery according to the present invention, the first electrode may comprise the first collector and the first electrode active material layer, and the conductive adhesive member for improving the conductivity may be comprised at the portion at which the first collectors overlap each other. Due to the above-described characteristic, the bonding property and conductivity between the first collectors overlapping each other may be improved.

In addition, in the secondary battery according to the present invention, the protective member having the insulating property may be provided on the cap part facing the upper end of the first electrode. Due to the above-described characteristic, the cap part and the first electrode may be prevented from being in contact with each other to prevent the first electrode from being damaged.

In addition, in the secondary battery according to the present invention, the second protrusion piece of the second electrode may be formed as the embossing part or the wrinkle part. Due to the above-described characteristic, the second protrusion piece and the can may be easily bonded to each other.

In addition, in the secondary battery according to the present invention, the insulating member comprising the insulating property may be provided at the end of each of the first and second protrusion pieces. Due to the above-described characteristic, the electrode assembly may be provided from being damaged by the ends of the first and second protrusion pieces, and the short circuit may be prevented from occurring by the ends of the first and second protrusion pieces.

MODE FOR CARRYING OUT THE INVENTION

Figure 1:
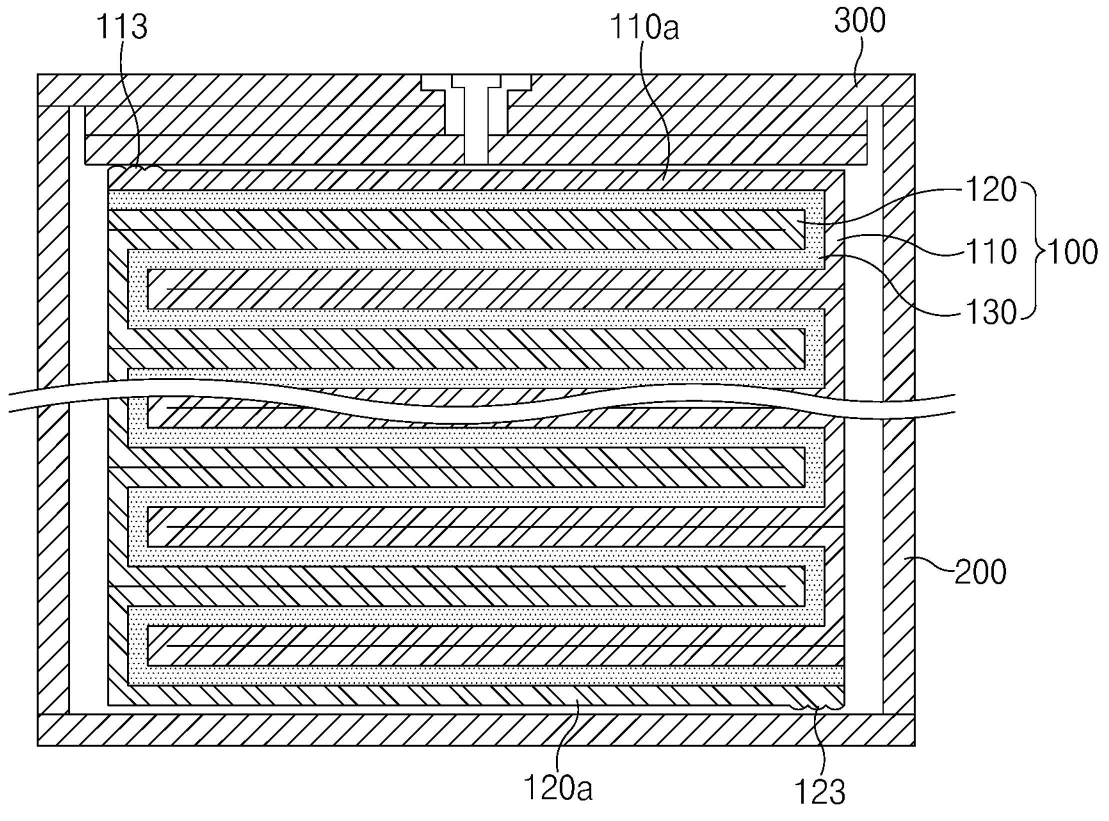
FIG. 1 is a cross-sectional view of a secondary battery according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

Secondary Battery According to First Embodiment of the Present Invention

As illustrated in FIGS. 1 to 4, a secondary battery according to a first embodiment of the present invention comprises an electrode assembly 100, a can 200 accommodating the electrode assembly 100, and a cap part 300 mounted in an opening of the can 200.

Here, the electrode assembly 100 comprises a first electrode 110 bent in a zigzag shape, a second electrode 120 bent in a zigzag shape to overlap the first electrode 110, and a separator 130 interposed between the first and second electrodes 110 and 120 and bent in a zigzag shape.

Figure 2:
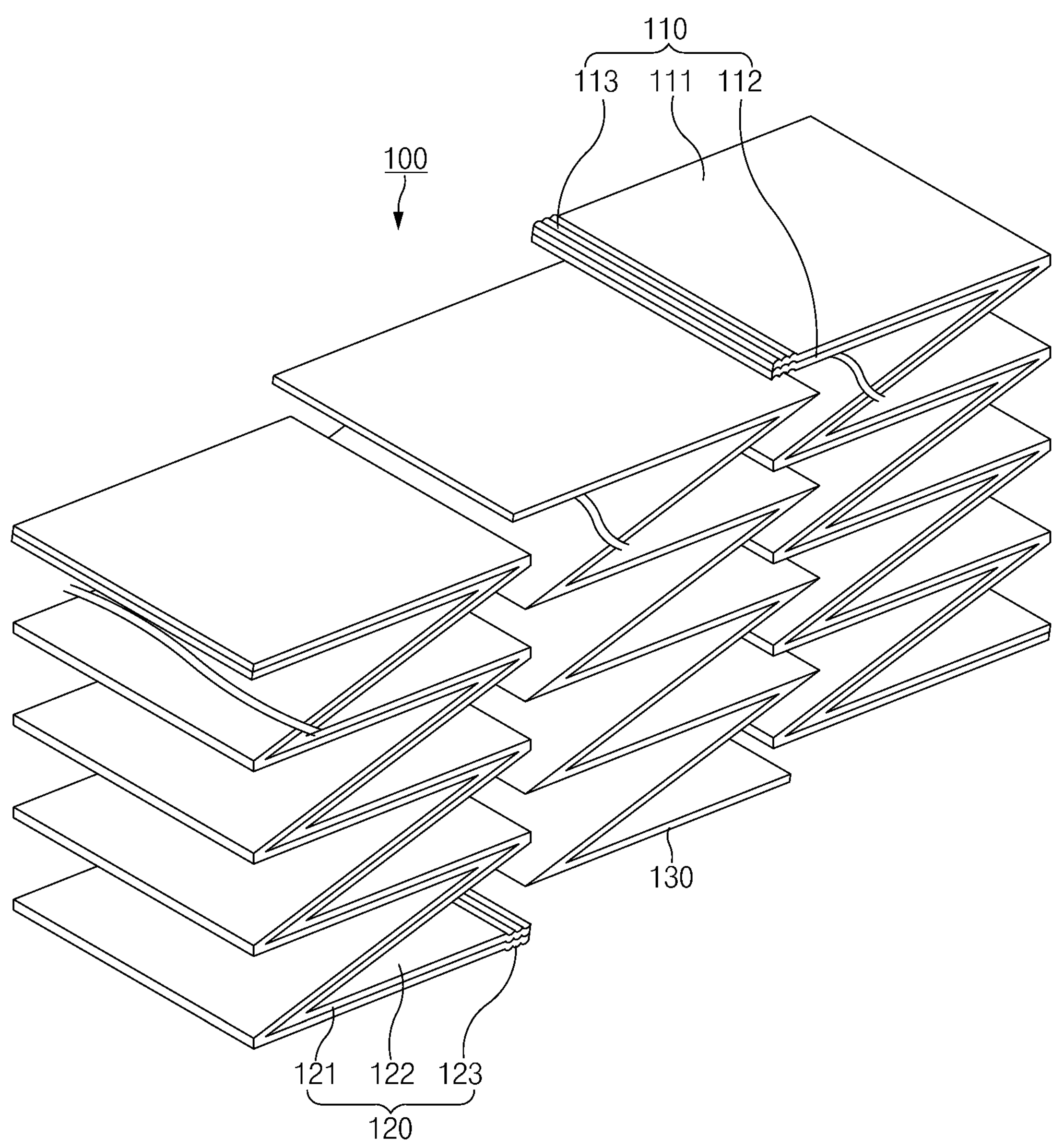
FIG. 2 is a perspective view illustrating an electrode assembly of the secondary battery according to the first embodiment of the present invention.
Figure 3:
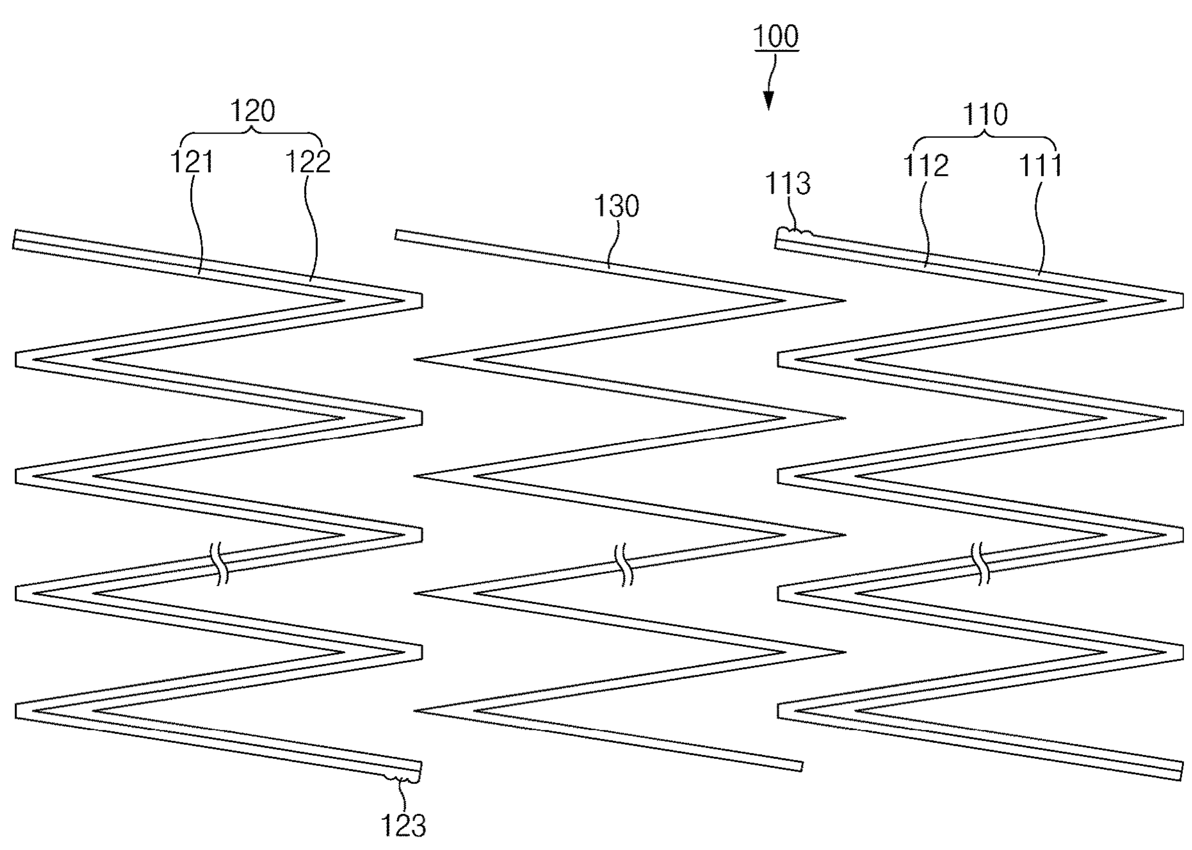
FIG. 3 is a side view of FIG. 2.

The first electrode 110 comprises a first collector 111 bent in a zigzag shape and a first electrode active material layer 112 provided on one surface (a surface facing a left direction of the first electrode when viewed in FIG. 2) of the first collector 111 facing the second electrode 120. The other surface (a surface facing a right direction of the first electrode when viewed in FIG. 2) of the first collector 111 is provided as a non-coating surface, on which the first electrode active material layer does not exist.

That is, the first electrode 110 comprises the first electrode active material layer 112 on the one surface thereof and the non-coating surface, on which the electrode active material layer does not exist, on the other surface thereof.

The second electrode 120 comprises a second collector 121 bent in a zigzag shape to overlap the first electrode and a second electrode active material layer 122 provided on one surface (a surface facing a left direction of the second electrode when viewed in FIG. 2) of the second collector 121 facing the first electrode 110. The other surface (a surface facing a left direction of the second electrode when viewed in FIG. 2) of the second collector 121 is provided as a non-coating surface, on which the second electrode active material layer does not exist.

That is, the second electrode 120 comprises the second electrode active material layer 122 on the one surface thereof and the non-coating surface, on which the electrode active material layer does not exist, on the other surface thereof.

The separator 130 has a zigzag shape to be interposed between the first electrode 110 and the second electrode 120, which overlap each other in a zigzag shape.

In the secondary battery having the above-described structure according to the first embodiment of the present invention, the first electrode 110, the separator 130, and the second electrode 120 may be stacked to overlap each other in a vertical direction to manufacture the electrode assembly 100, thereby improving simplification of the process.

The secondary battery according to the first embodiment of the present invention improves a bonding structure of the electrode assembly and the cap part, a bonding structure of the electrode assembly and the can, and the structure of the electrode assembly to increase in integration of the electrode assembly accommodated in the can, thereby improving energy density.

As a first example, in the secondary battery according to the first embodiment of the present invention, an upper end 110*a* of the first electrode 110 is disposed at the uppermost end of the electrode assembly 100 to extend longer than the second electrode 120, and a first protrusion piece 113 bonded to the cap part 300 is provided on the upper end 110*a* of the first electrode 110, which is disposed at the uppermost end of the electrode assembly 100.

That is, in the secondary battery according to the first embodiment of the present invention, the upper end 110*a* of the first electrode 110 may be bonded to the cap part 300 through the first protrusion 113 without being deformed in a direction of the cap part 300. Thus, a space between the electrode assembly 100 and the cap part 300 may be significantly reduced, and the electrode assembly 100 may be additionally secured by the reduced space, thereby improving the energy density.

The first protrusion piece 113 is provided as one or more embossing part, which protrudes toward the cap part 300, at the upper end of the first collector 111, and the embossing part may be formed by molding the upper end of the first collector 111 to protrude in the direction of the cap part. Thus, the first protrusion piece 113 may be formed without a separate additional configuration, and as a result, the simplification of the process may increase.

Here, the upper end 110*a* of the first electrode 110 provided with the first protrusion piece 113 may be provided as a non-coating surface on which the electrode active material layer does not exist on both surfaces thereof.

The upper end 110*a* of the first electrode 110, which is disposed at the uppermost end of the electrode assembly 100, may have a thickness greater than that of the remaining portion of the first electrode 110. Thus, the upper end 110*a* of the first electrode 110 may be significantly prevented from being bent or folded.

As a second example, in the secondary battery according to the first embodiment of the present invention, a lower end 120*a* of the second electrode 120 is disposed at the lowermost end of the electrode assembly 100 to extend longer than the first electrode 110, and a second protrusion piece 123 bonded to the can 200 is provided on the lower end 120*a* of the second electrode 120, which is disposed at the lowermost end of the electrode assembly 100.

That is, in the secondary battery according to the first embodiment of the present invention, the lower end 120*a* of the second electrode 120 may be bonded to the can 200 through the second protrusion 123 without being deformed in a direction of the can 200. Thus, a space between the electrode assembly 100 and the can 200 may be significantly reduced, and the electrode assembly 100 may be additionally secured by the reduced space, thereby improving the energy density.

The second protrusion piece 123 is provided as one or more embossing part, which protrudes toward the can 200, at the lower end of the second collector 121, and the embossing part may be formed by punching the upper end of the second collector 121 to protrude in the direction of the can. Thus, the second protrusion piece 123 may be formed without a separate additional configuration, and as a result, the simplification of the process may increase.

Here, the lower end 120*a* of the second electrode 120 provided with the second protrusion piece 123 may be provided as a non-coating surface on which the electrode active material layer does not exist on both surfaces thereof.

The lower end 120*a* of the second electrode 120, which is disposed at the lowermost end of the electrode assembly 100, may have a thickness greater than that of the remaining portion of the second electrode. Thus, the lower end 120*a* of the second electrode 120 may be significantly prevented from being bent or folded.

An insulating member 140 having an insulating property may be provided at an end of the first protrusion piece 113 or the second protrusion piece 123, and thus, the short circuit may be previously prevented from occurring by the end of the first protrusion piece 113 or the second protrusion piece 123. Particularly, the insulating member 140 may prevent the end of the first protrusion piece 113 or the second protrusion piece 123 from being damaged, or the insulating member 140 may prevent the first electrode, the separator, and the second electrode from being damaged by the end of the first protrusion piece 113 or the second protrusion piece 123.

As a third example, in the secondary battery according to the first embodiment of the present invention, the conductive adhesive member 150 that increases in conductivity may be provided at a portion of the other surface (a right surface when viewed in FIG. 2), on which the first collectors 111 overlap each other at the first electrode 110 bent in the zigzag shape. Thus, the first electrode may be improved in conductivity of the first electrode 110, and the first collectors 111 overlapping each other may be improved in adhesion and bonding through the conductive adhesive member 150.

The conductive adhesive member 150 that increases in conductivity may be provided at a portion (a left surface when viewed in FIG. 2), at which the second collectors 121 overlap each other at the second electrode 120 bent in the zigzag shape. Thus, the second electrode may be improved in conductivity of the second electrode 120, and the second collectors 121 overlapping each other may be improved in adhesion and bonding through the conductive adhesive member 150.

Here, the thickness of the conductive adhesive member 150 is less than that of the first collector 111 or the second collector 121. That is, as the thickness of the conductive adhesive member 150 decreases, a degree of integration of the electrode assembly accommodated in the can may increase.

A protective member 160 having an insulating property may be provided on a bottom surface of the cap part 300 facing the upper end 110*a* of the first electrode 110, and the upper end 110*a* of the first electrode 110 and the cap part 300 may be prevented from being in contact with each other through the protective member 160 to prevent the upper end 110*a* of the first electrode 110 from being damaged.

A protective member 160 having an insulating property may be provided on a bottom surface of the can 200 facing the lower end 120*a* of the second electrode 120, and the lower end 120*a* of the second electrode 120 and the can 200 may be prevented from being in contact with each other through the protective member 160 to prevent the lower end 120*a* of the second electrode 120 from being damaged.

Thus, the secondary battery according to the first embodiment of the present invention improves the bonding structure of the electrode assembly and the cap part, the bonding structure of the electrode assembly and the can, and the structure of the electrode assembly to increase in integration of the electrode assembly accommodated in the can, thereby improving the energy density.

Hereinafter, a method for manufacturing the secondary battery according to the first embodiment of the present invention will be described.

Method for Manufacturing Secondary Battery According to First Embodiment of the Present Invention As illustrated in FIGS. 5 to 8, a method for manufacturing the secondary battery manufacturing method according to the first embodiment of the present invention comprises a preparation step (S10), a molding step (S20), an assembly step (S30), an accommodation step (S40), and a bonding step (S50).

Preparation Step

The preparation step (S10) comprises a first process of bending a first electrode 110 in a zigzag shape, a second process of bending a second electrode 120 in a zigzag shape to overlap the first electrode 110, and a third process of bending a separator 130, which is interposed between the first electrode 110 and the second electrode 120, in a zigzag shape. Here, in the first process, an upper end 110*a* of the first electrode 110 is provided to extend longer than the second electrode 120, and in the second process, a lower end 120*a* of the second electrode 120 is provided to extend under the first electrode 110.

Here, the first electrode 110 comprises a first collector 111 and a first electrode active material layer 112. The first electrode active material layer 112 is provided on only one surface of the first collector 111 facing the second electrode. Also, the second electrode 120 comprises a second collector 121 and a second electrode active material layer 122. The second electrode active material layer 122 is provided on only the second collector 121 facing the first electrode.

Molding Step

In the molding step (S20), a first protrusion piece 113 is molded on the upper end 110*a* of the first electrode 110, and a second protrusion piece 123 is molded on the lower end 120*a* of the second electrode 120. Here, the first protrusion piece 113 is provided as one or more embossing parts for molding a portion of the upper end 110*a* of the first electrode 110 to protrude to the outside, and the second protrusion piece 123 is provided as one or more embossing parts for molding a portion of the lower end 120*a* of the second electrode 120 to protrude to the outside.

In the molding step (S20), an insulating material having an insulating property is applied to ends of the first and second protrusion pieces 113 and 123, and thus, an insulating member 140 is formed on each of the ends of the first and second protrusion pieces 113 and 123.

Assembly Step

In the assembly step (S30), the first electrode 110 bent in the zigzag shape, the separator 130 bent in the zigzag shape, and the second electrode 120 bent in the zigzag shape overlap each other to assembly an electrode assembly 100. Here, the first protrusion piece 113 formed on the upper end 110*a* of the first electrode 110 is disposed on the uppermost end of the electrode assembly 100, and the second protrusion piece 123 formed on the lower end of the second electrode 120 is disposed on the lowermost end of the electrode assembly 100.

The assembly step (S30) further comprises a process of providing a conductive adhesive member 150 for increasing in conductivity at a portion at which the first collectors 111 overlap each other at the first electrode 110, and thus, adhesion, bonding, and conductivity between the first collectors 111 may be improved. In addition, the assembly step (S30) further comprises a process of providing a conductive adhesive member 150 for increasing in conductivity at a portion at which the second collectors 121 overlap each other at the second electrode 120, and thus, adhesion, bonding, and conductivity between the second collectors 121 may be improved.

Accommodation Step

In the accommodation step (S40), the electrode assembly 100 is accommodated in a can 200. Here, the second protrusion piece 123 disposed on the lowermost end of the electrode assembly 100 is bonded to a bottom surface of the can 200.

In the accommodation step (S40), before accommodating the electrode assembly in the can, the protective member 160 having the insulating properties may be attached to the bottom surface of the can 200 corresponding to the lower end 120*a* of the second electrode 120 to prevent the lower end of the second electrode 120 and the can 200 from being in contact with each other through the protective member 160, thereby preventing the lower end of the second electrode 120 from being damaged.

Bonding Step

Figure 4:
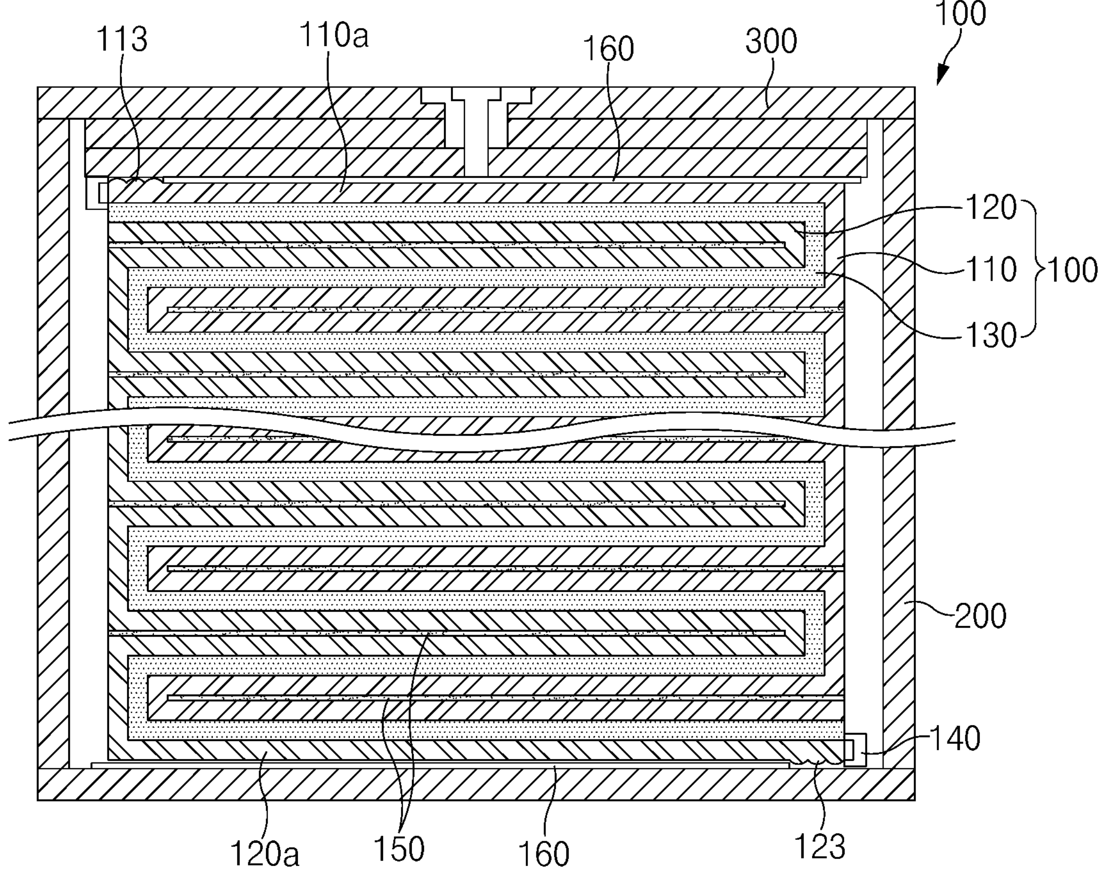
FIG. 4 is a cross-sectional view of the secondary battery comprising an adhesive member according to the first embodiment of the present invention.
Figure 5:
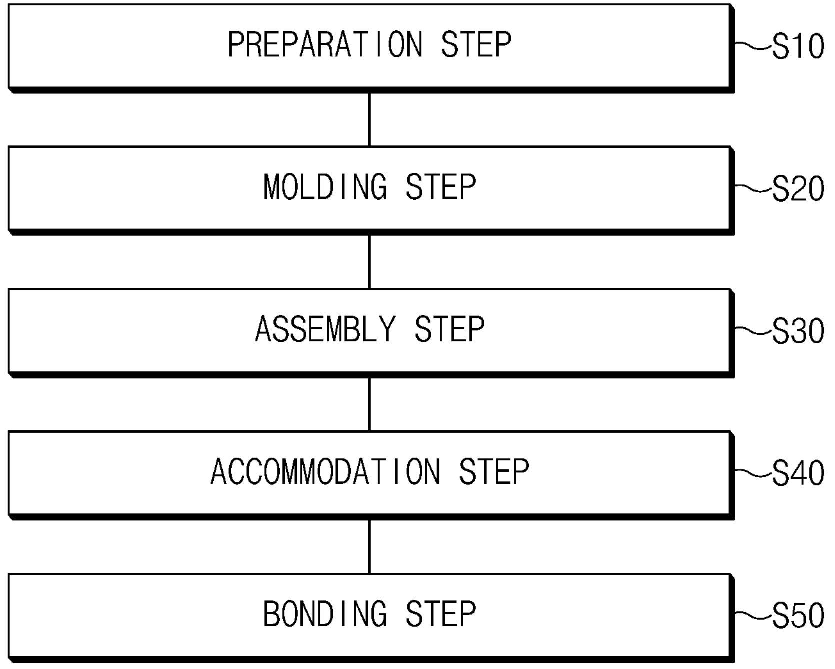
FIG. 5 is a flowchart illustrating a method for manufacturing the secondary battery according to the first embodiment of the present invention.
Figure 6:
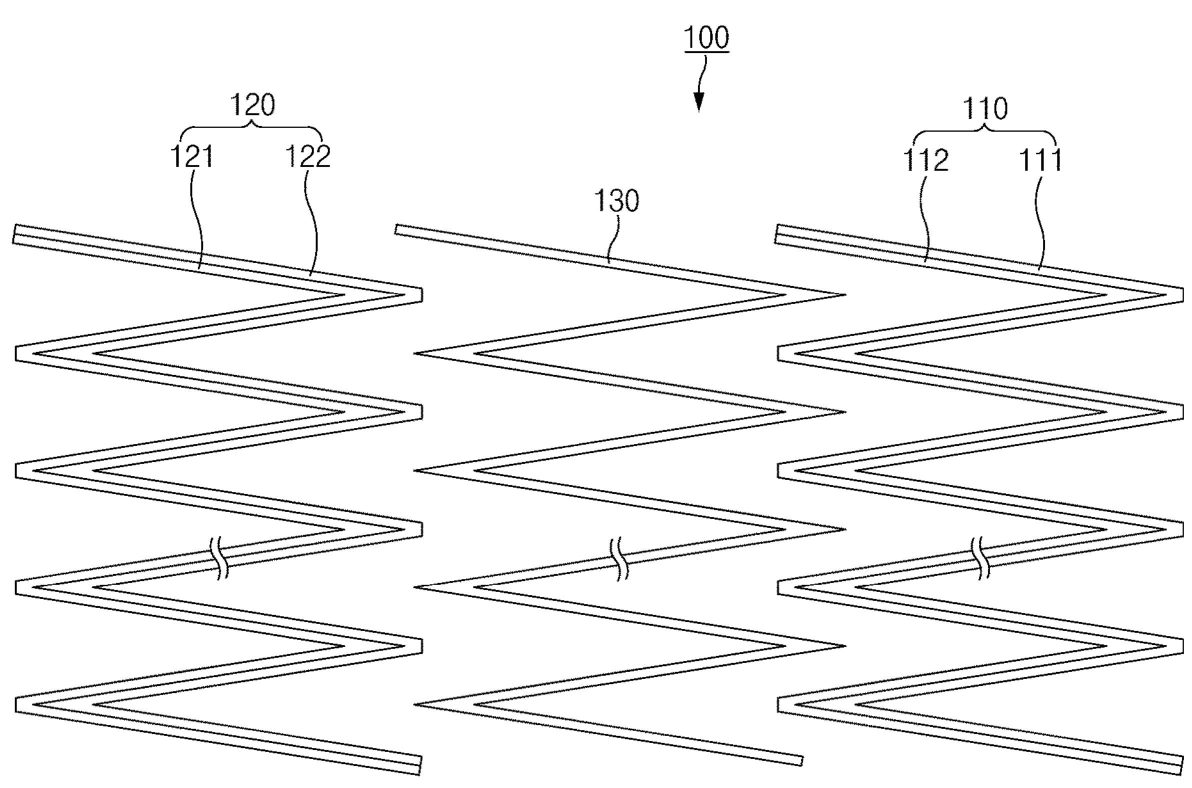
FIG. 6 is a side view illustrating a preparation step of the method for manufacturing the secondary battery according to the first embodiment of the present invention.
Figure 7:
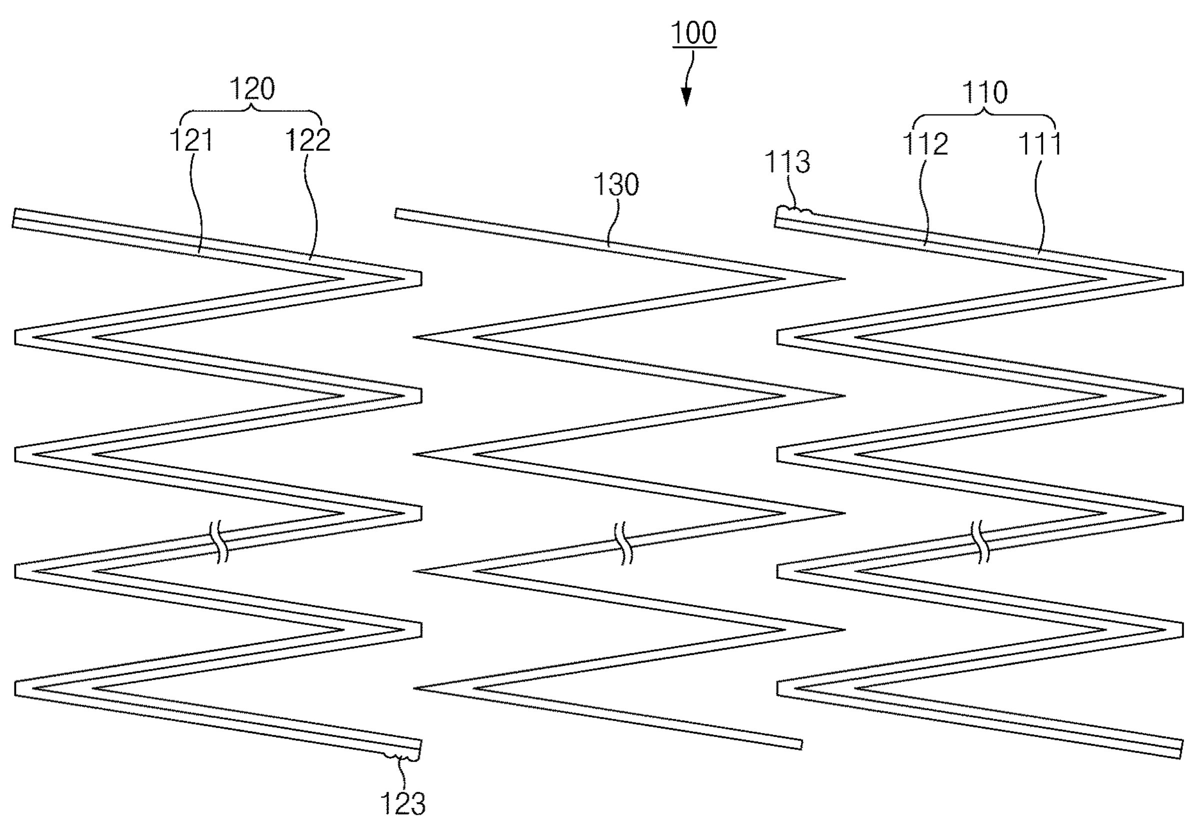
FIG. 7 is a side view illustrating a molding step of the method for manufacturing the secondary battery according to the first embodiment of the present invention.
Figure 8:
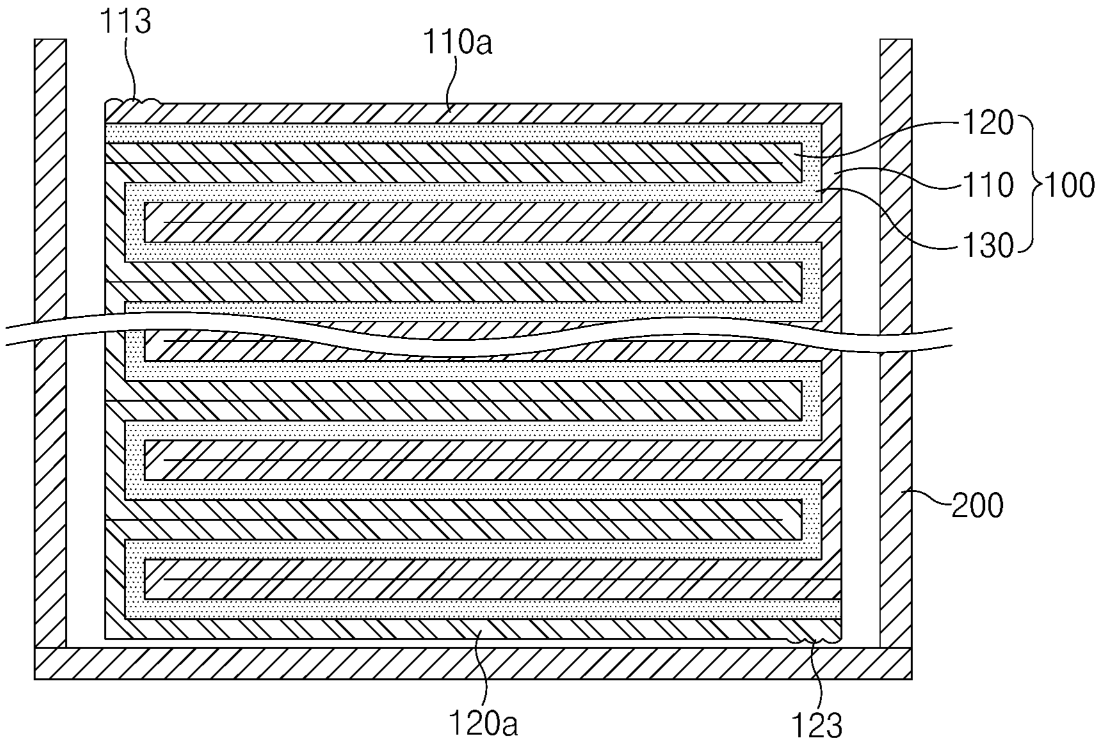
FIG. 8 is a cross-sectional view illustrating an assembly step and an accommodation step of the method for manufacturing the secondary battery according to the first embodiment of the present invention.

In the bonding step (S50), a cap part 300 is bonded to an opening of the can 200. Here, the first protrusion piece 113 disposed on the uppermost end of the electrode assembly 100 is bonded to the bottom surface of the cap part 300 to manufacture a finished secondary battery as illustrated in FIG. 4.

In the bonding step (S50), a protective member 160 having an insulating property may be provided on a bottom surface of the cap part 300 facing the upper end 110*a* of the first electrode 110, and the upper end 110*a* of the first electrode 110 and the cap part 300 may be prevented from being in contact with each other through the protective member 160 to prevent the upper end 110*a* of the first electrode 110 from being damaged.

Hereinafter, in descriptions of another embodiment of the present invention, constituents having the same function as the above-mentioned embodiment have been given the same reference numeral in the drawings, and thus duplicated description will be omitted.

Secondary Battery According to Second Embodiment of the Present Invention

Figure 9:
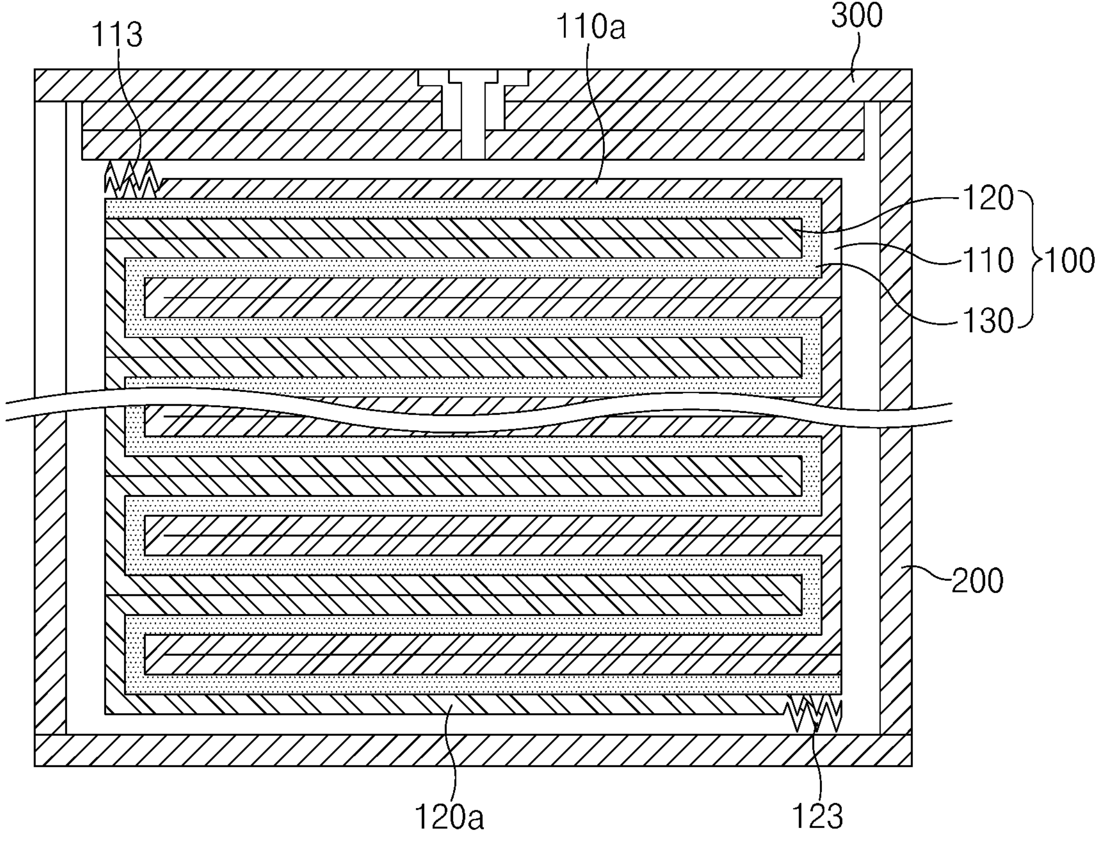
FIG. 9 is a cross-sectional view of a secondary battery according to a second embodiment of the present invention.
Figure 10:
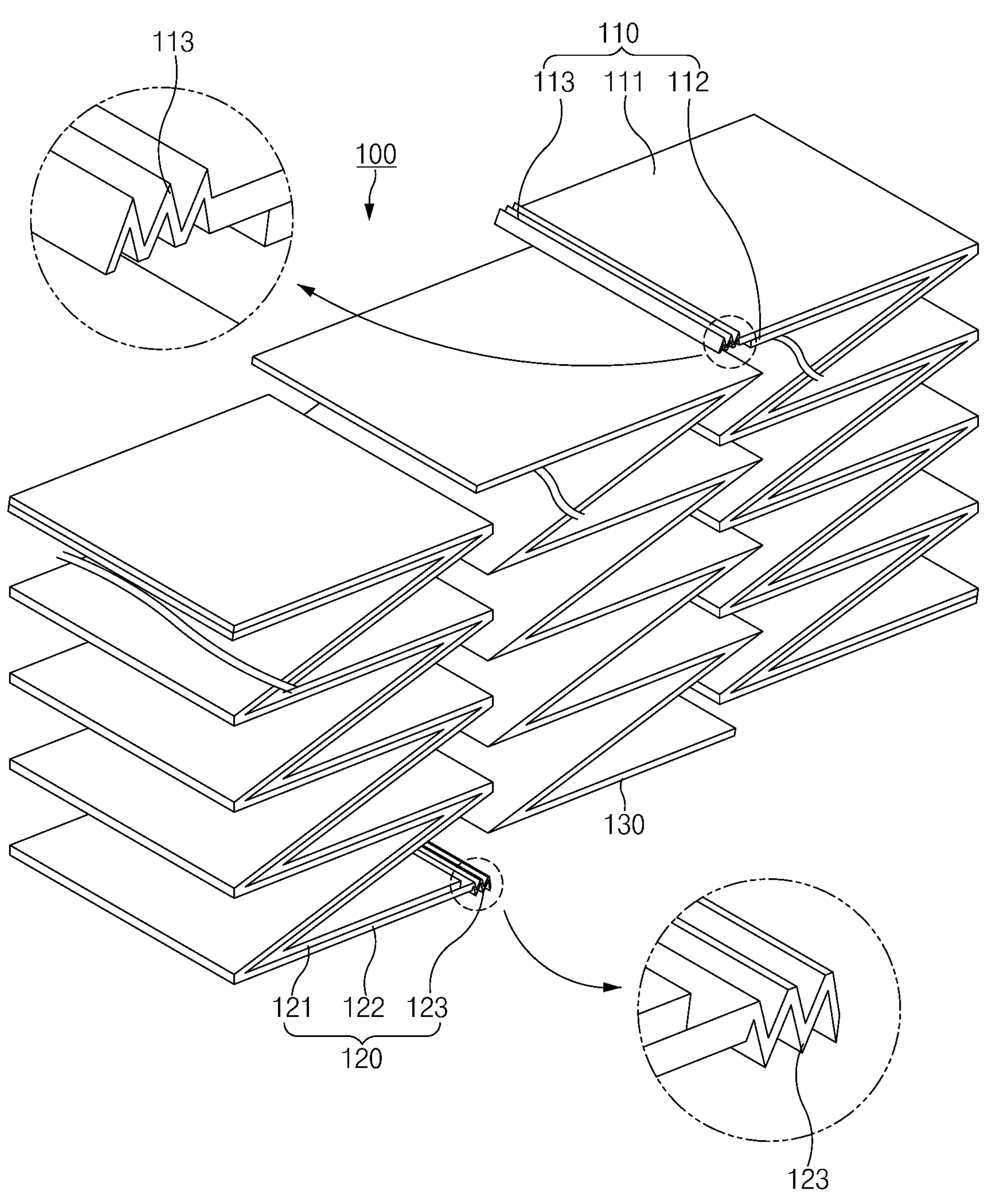
FIG. 10 is a perspective view illustrating an electrode assembly of the secondary battery according to the second embodiment of the present invention.
Figure 11:
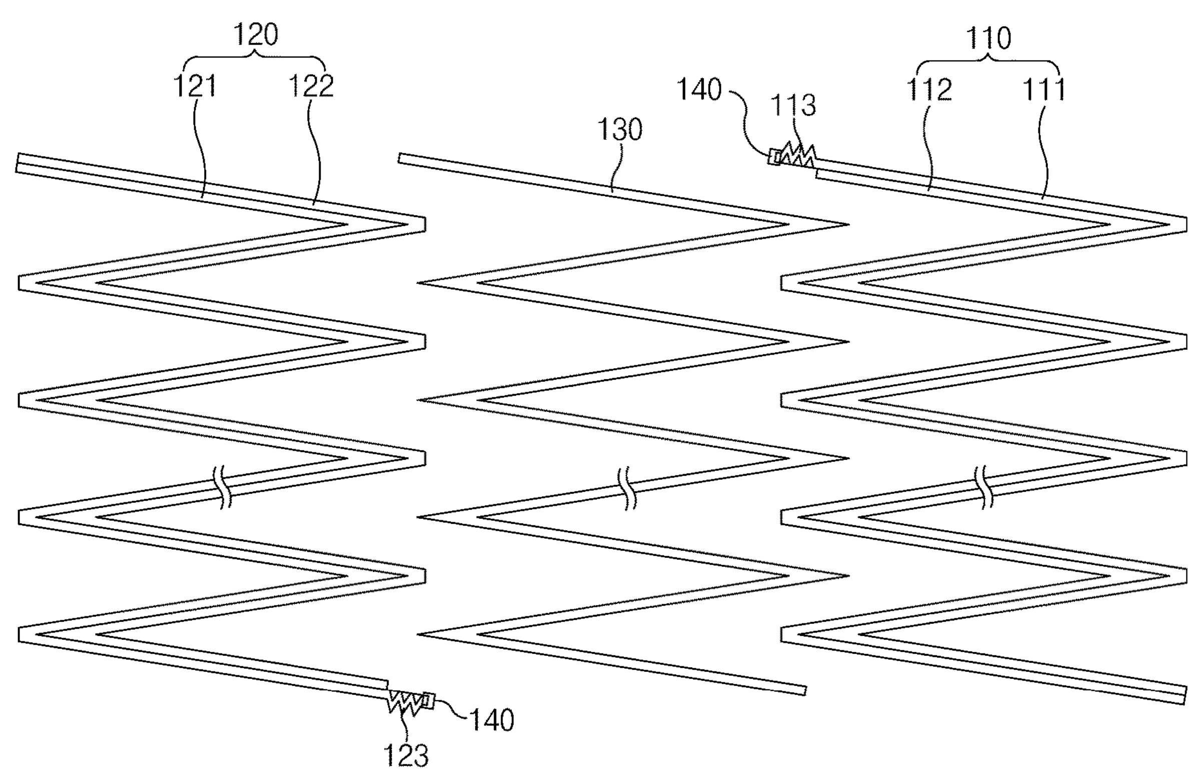
FIG. 11 is a side view of FIG. 10.

As illustrated in FIGS. 9 to 11, a secondary battery according to a second embodiment of the present invention comprises an electrode assembly 100, a can 200 accommodating the electrode assembly 100, and a cap part 300 mounted in an opening of the can 200.

The electrode assembly 100 comprises a first electrode 110 bent in a zigzag shape, a second electrode 120 bent in a zigzag shape to overlap the first electrode 110, and a separator 113 interposed between the first and second electrodes 111 and 112 and bent in a zigzag shape.

Also, a first protrusion piece 113 bonded to the cap part 300 is provided on an upper end 110*a* of the first electrode 110 disposed on the uppermost end of the electrode assembly 100, and a second protrusion piece 123 bonded to the can 200 is provided on a lower end 120*a* of the second electrode 120 disposed on the lowermost end of the electrode assembly 100.

Here, the first protrusion piece 113 is provided as a wrinkle part, which is bent in a zigzag shape along a width direction of the can 200 and of which a protruding portion facing the cap part 300 is bonded to the cap part 300, at the upper end of the first collector 111 of the first electrode 110.

That is, since the first protrusion piece 113 is provided as the wrinkle part bent in the zigzag shape, a length of the first protrusion piece 113 may easily increase or decrease, and as a result, the first protrusion piece 113 may be adjusted in length according to a position of the cap part 300 to improve bonding between the first protrusion piece 113 and the cap part 300.

In addition, the second protrusion piece 123 is a wrinkle part, which is bent in a zigzag shape along a width direction of the can 200 and of which a protruding portion facing the cap part 300 is bonded to a bottom surface of the can 200, at the lower end of the second collector 121 of the second electrode 120.

That is, since the second protrusion piece 123 is provided as the wrinkle part bent in the zigzag shape, a length of the second protrusion piece 123 may easily increase or decrease, and as a result, the second protrusion piece 123 may be adjusted in length according to a bonded point of the can 200 to improve bonding between the second protrusion piece 123 and the can 200.

A method for manufacturing the secondary battery having the above-described structure according to the second embodiment of the present invention comprises a preparation step (S10), a molding step (S20), an assembly step (S30), an accommodation step (S40), and a bonding step (S50). Here, the preparation step (S10), the assembly step (S30), the accommodation step (S40), and the bonding step (S50) are the same as those of the method for manufacturing the secondary battery according to the foregoing first embodiment, and thus duplicated descriptions thereof will be omitted.

In the molding step (S20), a first protrusion piece 113 is molded on an upper end of a first electrode 110, and a second protrusion piece 123 is molded on a lower end 120*a* of a second electrode 120. Here, the first protrusion piece 113 is molded in the form of a wrinkle part by bending the upper end 110*a* of the first electrode 110 in a zigzag shape along a width direction of a can 200. In addition, the second protrusion piece 123 is molded in the form of a wrinkle part by bending the lower end 120*a* of the second electrode 120 in a zigzag shape along the width direction of a can 200.

Here, an insulating material having an insulating property is applied to ends of the first and second protrusion pieces 113 and 123, and thus, an insulating member 140 is formed on each of the ends of the first and second protrusion pieces 113 and 123.

In the method for manufacturing the secondary battery according to the second embodiment of the present invention, each of the first and second protrusion pieces 113 and 123 may be adjusted in length by forming the first and second protrusion pieces 113 and 123 as the wrinkle parts. As a result, the bonding between the electrode assembly 100 and the cap part 300 and between the electrode assembly 100 and the can 200 may be improved.

Secondary Battery According to Third Embodiment of the Present Invention

Figure 12:
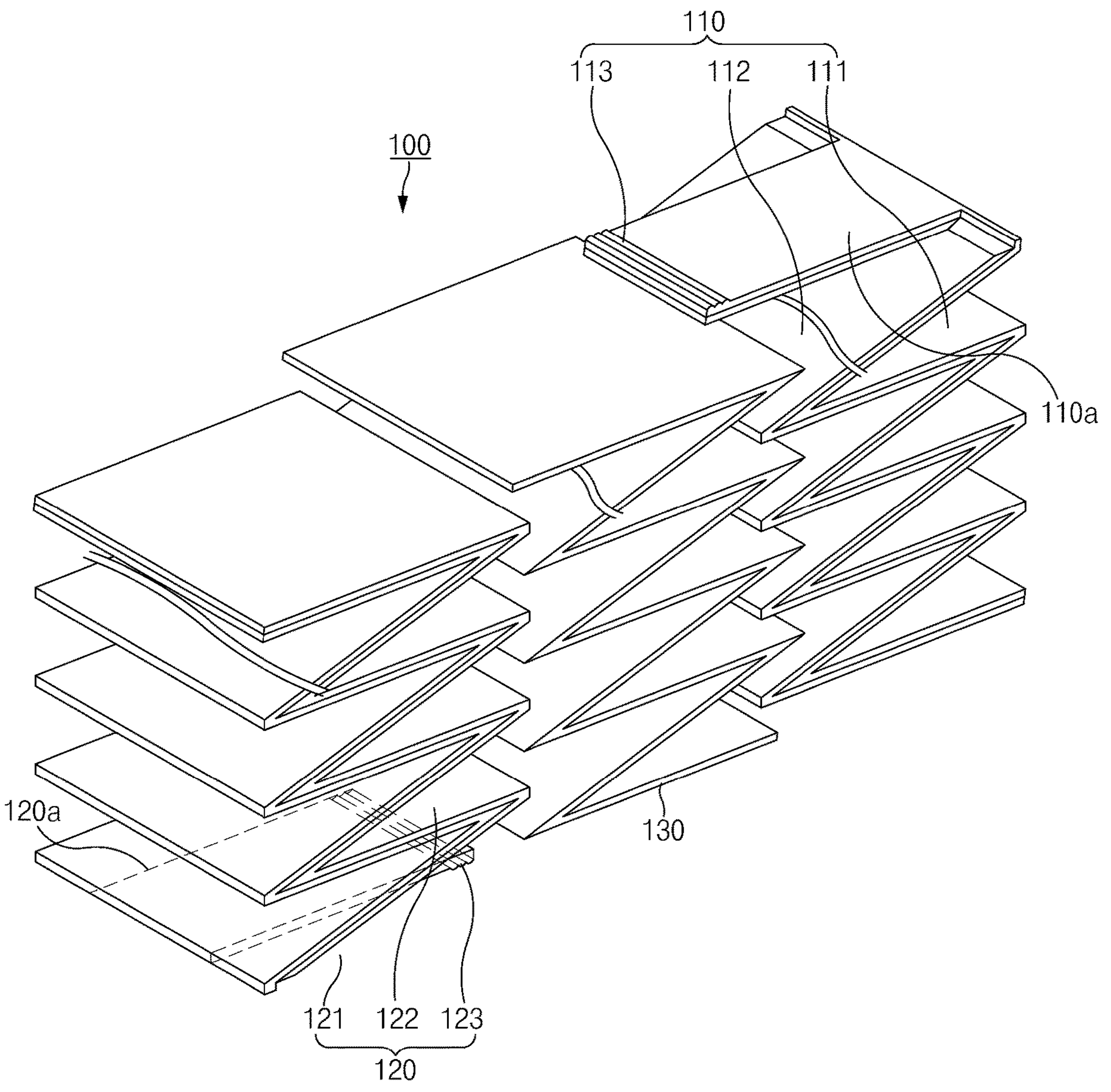
FIG. 12 is a perspective view of a secondary battery according to a third embodiment of the present invention.

As illustrated in FIG. 12, a secondary battery according to a third embodiment of the present invention comprises an electrode assembly 100, a can 200 accommodating the electrode assembly 100, and a cap part 300 mounted in an opening of the can 200.

Here, an upper end 110*a* of a first electrode 110, which is disposed at the uppermost end of the electrode assembly 100, may have a width less than that of a remaining portion of the first electrode 110. Thus, the upper end 110*a* of the first electrode 110 may be significantly prevented from being in contact with an inner wall of a can 200 to prevent short circuit from occurring.

In addition, a lower end 120*a* of a second electrode 120, which is disposed at the lowermost end of the electrode assembly 100, may have a width less than that of a remaining portion of the second electrode 120. Thus, the lower end 110*a* of the second electrode 110 may be prevented from being in contact with the inner wall of the can 200 to prevent the lower end 120*a* of the second electrode 120 from being damaged.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

100: Electrode assembly
110: First electrode
111: First collector
112: First electrode active material layer
113: First protrusion piece
120: Second electrode
121: Second collector
122: Second electrode active material layer
123: Second protrusion piece
130: Separator

The invention claimed is:

1. A secondary battery comprising:

an electrode assembly comprising a first electrode bent in a zigzag shape, a second electrode bent in a zigzag shape to overlap the first electrode, and a separator bent in a zigzag shape to be interposed between the first and second electrodes;

a can configured to accommodate the electrode assembly; and a cap mounted to an opening of the can, wherein the first electrode comprises a first collector and a first electrode active material layer provided on a surface of the first collector facing the second electrode, wherein the second electrode comprises a second collector and a second electrode active material layer provided on a surface of the second collector facing the first electrode, wherein an upper end of the first electrode is disposed on an uppermost end of the electrode assembly to extend above the second electrode, wherein a lower end of the second electrode is disposed on a lowermost end of the electrode assembly to extend under the first electrode, wherein a first protrusion piece at a first end of the first electrode bonded to the cap is provided on the upper end of the first electrode, the first protrusion piece having a top surface, a bottom surface and an end surface, wherein a second protrusion piece at a first end of the second electrode bonded to the can is provided on the lower end of the second electrode, the second protrusion piece having a top surface, a bottom surface and an end surface, wherein the first protrusion piece is bonded to the cap while protruding toward the cap at an upper end of the first collector, wherein the second protrusion piece is bonded to the can while protruding toward the can, at a lower end of the second collector, wherein the upper end of the first electrode provided with the first protrusion piece may have a thickness greater than that of the remaining portion of the first electrode, wherein the lower end of the second electrode provided with the second protrusion piece may have a thickness greater than that of the remaining portion of the second electrode, wherein an insulating member having an insulating property covers the end surface of the first protrusion piece or the second protrusion piece.

2. The secondary battery of claim 1, wherein the first protrusion piece is provided as an embossing part.

3. The secondary battery of claim 1, wherein the first protrusion piece is provided as a wrinkle part, which is bent in a zigzag shape along a width direction of the can, at an upper end of the first collector.

4. The secondary battery of claim 2, wherein a conductive adhesive member for improving conductivity is provided on a portion of the first electrode at which the first collectors overlap each other.

5. The secondary battery of claim 1, wherein a protective member having an insulating property is provided on the cap facing the upper end of the first electrode.

6. The secondary battery of claim 1, wherein the second protrusion piece is provided as an embossing part.

7. The secondary battery of claim 1, wherein the second protrusion piece is provided as a wrinkle part, which is bent in a zigzag shape along a width direction of the can, at a lower end of the second collector.

8. The secondary battery of claim 6, wherein a conductive adhesive member for improving conductivity is provided on a portion of the second electrode, at which the second collectors overlap each other.

9. The secondary battery of claim 1, wherein a protective member having an insulating property is provided on the can facing the lower end of the second electrode.

10. The secondary battery of claim 3, wherein folds in the electrode assembly extend in a width direction, and wherein the upper end of the first electrode has a width less than a width of a remaining portion of the first electrode.

11. The secondary battery of claim 7, wherein folds in the electrode assembly extend in a width direction, and wherein the lower end of the second electrode has a width less than a width of a remaining portion of the second electrode.

12. A method for manufacturing a secondary battery, the method comprising:

bending a first electrode in a zigzag shape, bending a second electrode in a zigzag shape to overlap the first electrode, and bending a separator, which is interposed between the first electrode and the second electrode, in a zigzag shape, wherein an upper end of the first electrode is above the second electrode, and a lower end of the second electrode is below the first electrode;

molding a first protrusion piece on the upper end of the first electrode and molding a second protrusion piece on the lower end of the second electrode;

overlapping the first electrode, the separator, and the second electrode, so as to assembly an electrode assembly, wherein the first protrusion piece formed on the upper end of the first electrode is disposed on an uppermost end of the electrode assembly, and the second protrusion piece formed on the lower end of the second electrode is disposed on a lowermost end of the electrode assembly;

accommodating the electrode assembly in a can, wherein the second protrusion piece disposed on the lowermost end of the electrode assembly is bonded to a bottom surface of the can; and bonding a cap to an opening of the can, wherein the first protrusion piece disposed on the uppermost end of the electrode assembly is bonded to the cap, wherein the first electrode comprises a first collector and a first electrode active material layer provided on a surface of the first collector facing the second electrode and an uncoated portion, wherein the second electrode comprises a second collector and a second electrode active material layer provided on a surface of the second collector facing the first electrode and an uncoated portion, and wherein the upper end of the first electrode provided with the first protrusion piece may have a thickness greater than that of the remaining portion of the first electrode, wherein the lower end of the second electrode provided with the second protrusion piece may have a thickness greater than that of the remaining portion of the second electrode, wherein an insulating member having an insulating property covers the end surface of the first protrusion piece or the second protrusion piece.

13. The method of claim 12, wherein the first protrusion piece is provided as an embossing part protruding toward the cap or a wrinkle part bent in a zigzag shape along a width direction of the can.

14. The method of claim 13, wherein the second protrusion piece is provided as an embossing part protruding toward the can or a wrinkle part bent in a zigzag shape along a width direction of the can.

15. The secondary battery of claim 1, wherein a top surface of the first protrusion piece extends above the upper end of the electrode assembly and a top surface of the second protrusion piece extends below the lowermost end of the electrode assembly.

* * * * *